United States Patent
Ferdinand et al.

(10) Patent No.: US 6,811,132 B1
(45) Date of Patent: Nov. 2, 2004

(54) SUPPORT DEVICE

(75) Inventors: Mark R. Ferdinand, Bull Valley, IL (US); Wayne F. Adolf, Mt. Prospect, IL (US)

(73) Assignee: Markco, L.L.C., Bull Valley, IL (US)

( * ) Notice: Subject to any disclaimer, the term of this patent is extended or adjusted under 35 U.S.C. 154(b) by 0 days.

(21) Appl. No.: 10/755,046

(22) Filed: Jan. 9, 2004

(51) Int. Cl.[7] .......................... F04H 12/22; A01K 97/10
(52) U.S. Cl. ........................ 248/538; 248/520; 116/173
(58) Field of Search ................... 248/538, 520, 248/534, 535, 218.4, 309.1, 297.21, 539, 536; 116/173, 174; D11/182; 40/610, 603

(56) References Cited

U.S. PATENT DOCUMENTS

| | | | | |
|---|---|---|---|---|
| 2,118,467 A | * | 5/1938 | Jones | .......................... 403/173 |
| 3,675,616 A | * | 7/1972 | McInnis | ...................... 116/173 |
| 4,593,877 A | * | 6/1986 | van der Wyk | ............... 248/512 |
| 5,533,295 A | * | 7/1996 | Hochberger | ................. 43/21.2 |
| 5,588,630 A | * | 12/1996 | Chen-Chao | .................. 248/514 |
| RE35,731 E | * | 2/1998 | Latch | .......................... 248/535 |
| 5,961,087 A | * | 10/1999 | Lee | .............................. 248/362 |
| 6,402,116 B1 | * | 6/2002 | Northup | ....................... 248/514 |
| 6,584,927 B1 | * | 7/2003 | Iversen et al. | ............... 116/173 |
| 6,726,170 B2 | * | 4/2004 | Luo | ............................. 248/538 |

* cited by examiner

*Primary Examiner*—Leslie A. Braun
*Assistant Examiner*—Tan Le
(74) *Attorney, Agent, or Firm*—Wood, Phillips, Katz, Clark & Mortimer

(57) ABSTRACT

A device is provided for mounting a member (which could be a flag pole) to a support surface. The device includes a member holder which can rotate at least partially on an axis to a new position when subjected to a predetermined torque.

20 Claims, 8 Drawing Sheets

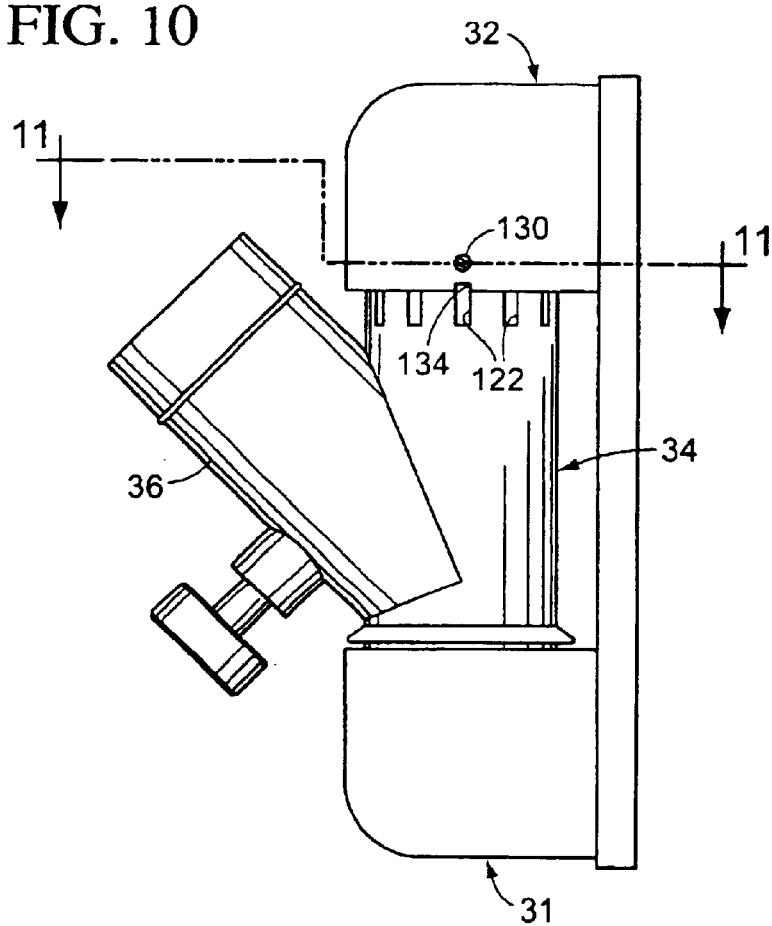
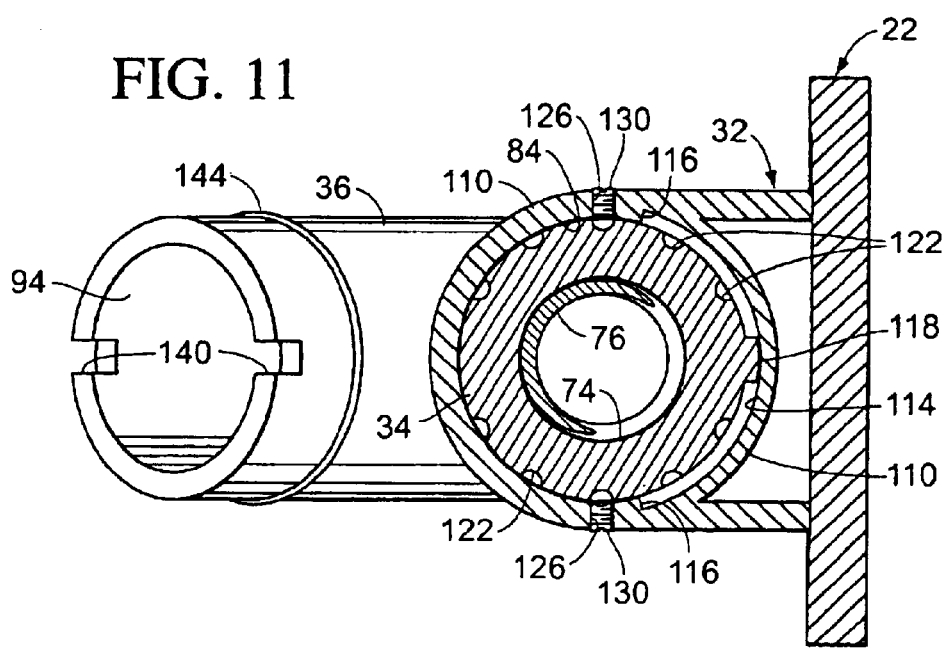

SUPPORT DEVICE

CROSS REFERENCE TO RELATED APPLICATION(S)

Not applicable

STATEMENT REGARDING FEDERALLY SPONSORED RESEARCH OR DEVELOPMENT

Not applicable.

REFERENCE TO A MICROFICHE APPENDIX

Not applicable

TECHNICAL FIELD

The present invention relates generally to a device for mounting on a support surface and for holding a member relative thereto. The device is particularly well suited for use in holding a pole for a flag, banner, or the like.

BACKGROUND OF THE INVENTION AND TECHNICAL PROBLEMS POSED BY THE PRIOR ART

A variety of brackets, holders, and other similar devices are available for holding a member on a support surface. Such a support surface may typically be a vertical or horizontal surface, such as a wall, roof, floor, or the like. Such a support surface may also be part of a vertical column, strut, or the like. Such a support surface may also be part of some other fixed or movable structure from which it is desired to support a member. Some types of these support devices are particularly suitable for holding a pole to which may be attached a flag or banner.

In some situations, the pole (or other member) which is supported may be subject to external forces which could put undue stress on the pole (or other member) being supported and/or put undue stress on the bracket or other type of holding device which supports the pole. For example, a flag pole with a flag mounted on it may be conventionally held in a flag pole support holder or bracket on a vertical exterior surface of a building or other exterior structure so that the pole and any flag or banner attached thereto is subjected to weather conditions, including, at times, high winds. A high wind can impose a force on the pole and on the flag or banner. An excessively high force may cause the pole to bend or break or may cause the bracket or other holding device to break, or pull out from the mounting surface, or otherwise fail in some way.

Thus, it would be desirable to provide an improved device for holding a member, which could be a flag pole, in a way that would accommodate externally imposed forces so as to minimize, or at least greatly reduce, the likelihood of either the member breaking or the holding device failing. Further, in applications where a flag or banner is hung from the member and where the fabric of the flag or banner is subjected to wind forces, it would be desirable if the device could operate to minimize the likelihood of the fabric being torn.

Further, such an improved device should preferably offer the user flexibility with respect to different orientations or positions in which the member (e.g., flag pole) can be supported.

It would also be advantageous if such an improved support device or holding device could accommodate the inclusion of an optional, adjustable locking system for locking the device to hold the supported member, such as a flag pole, at a predetermined orientation or angle relative to the support surface on which the device is mounted.

It would also be beneficial if such an improved device could accommodate an optional system for holding a second member (e.g., a second flag pole).

Further, it would be desirable if such an improved device could permit the holding of a member (e.g., flag pole) in a secure, but releasable manner.

Further, it would be beneficial if such an improved device could accommodate designs which are attractive, easy to assemble, and easy to use.

Such an improved device should also preferably be user friendly and accommodate designs which have an aesthetically pleasing appearance to potential purchasers and users.

It would further be beneficial to provide such an improved device with a design that would accommodate the use of relatively low cost components that could be relatively easily manufactured and assembled.

It would also be beneficial if such an improved device could readily accommodate its manufacture from a variety of different materials and could accommodate efficient, high-quality, high-speed, large-volume manufacturing techniques with a reduced product reject rate to produce products having consistent operating characteristics unit-to-unit with high reliability.

BRIEF SUMMARY OF THE INVENTION

The present invention provides an improved member holding device which can accommodate designs having the above-discussed benefits and features.

When the improved device is provided as a flag pole holder or bracket, the device is especially effective in tolerating high wind conditions which could cause the flag pole to break and/or otherwise impose high loads on the member or pole. The device moves as necessary to reorient the device and member held therein (e.g., flag pole) relative to an external force (e.g., high wind force) so as to minimize, or at least substantially reduce, the load that is actually imposed upon the member and/or upon the device holding the member on a support surface. In a preferred form of the device, the device is especially advantageous for holding a pole with a flag or banner that is fixedly attached along the length of the pole and that is subjected to potentially damaging wind forces. When the fabric of the flag or banner is subjected to wind forces having particular directions and sufficient magnitudes, the device operates by turning or rotating to an orientation that can reduce the wind resistance of the fixedly attached fabric so as to minimize, or at least substantially reduce, the likelihood that the fabric may tear.

The device may also be used for supporting members other than flag poles, such as structural or mechanical arms in various mechanisms which could be subjected to exterior loads, or such as other extending members providing other functions, including non-support functions.

According to one aspect of the present invention, a device is provided for mounting on a support surface and for holding at least a first member. The device includes first and second end caps for each being fixed relative to the support surface and for together defining a longitudinal axis of rotation. The device includes a shaft that (1) has first and second opposite ends, (2) is supported between the first and second end caps along the axis with the first end at the first end cap and with the second end at the second end cap, (3)

is at least partially rotatable on the axis, and (4) has a cam follower surface defined at the first end.

The device also includes a cam surface in a fixed orientation at the first end cap for engaging the shaft first end cam follower surface.

The device further includes a biasing mechanism at the second end cap for continuously exerting a biasing force against the shaft second end to continuously force the shaft first end cam follower surface against the cam surface at the first end cap. This urges the shaft toward a predetermined home position defined by a predetermined rotational orientation. The shaft can be rotated away from the home position if a sufficient torque is applied to the shaft. The shaft returns to the home position when the torque is removed from the shaft.

A holder on the shaft holds the first member, which may be a flag pole, extending arm, or other structure. The device can be provided with an optional bracket for holding a second member.

Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same.

FIG. 10 is a side elevational view similar to FIG. 3, but with the optional second member holding bracket omitted;

FIG. 11 is a cross-sectional view taken generally along the broken plane 11—11 in FIG. 10.

DETAILED DESCRIPTION

While this invention is susceptible of embodiment in many different forms, this specification and the accompanying drawings disclose only some specific forms as examples of the invention. The invention is not intended to be limited to the embodiments so described, however. The scope of the invention is pointed out in the appended claims.

For ease of description, the device of this invention is described in a typical, upright operating position, and terms such as upper, lower, horizontal, etc., are used with reference to this position. It will be understood, however, that the device of this invention may be manufactured, stored, transported, used, and sold in an orientation other than the position described.

Figures illustrating the device show some mechanical elements that are known and that will be recognized by one skilled in the art. The detailed descriptions of such elements are not necessary to an understanding of the invention, and accordingly, are herein presented only to the degree necessary to facilitate an understanding of the novel features of the present invention.

Figure 1:
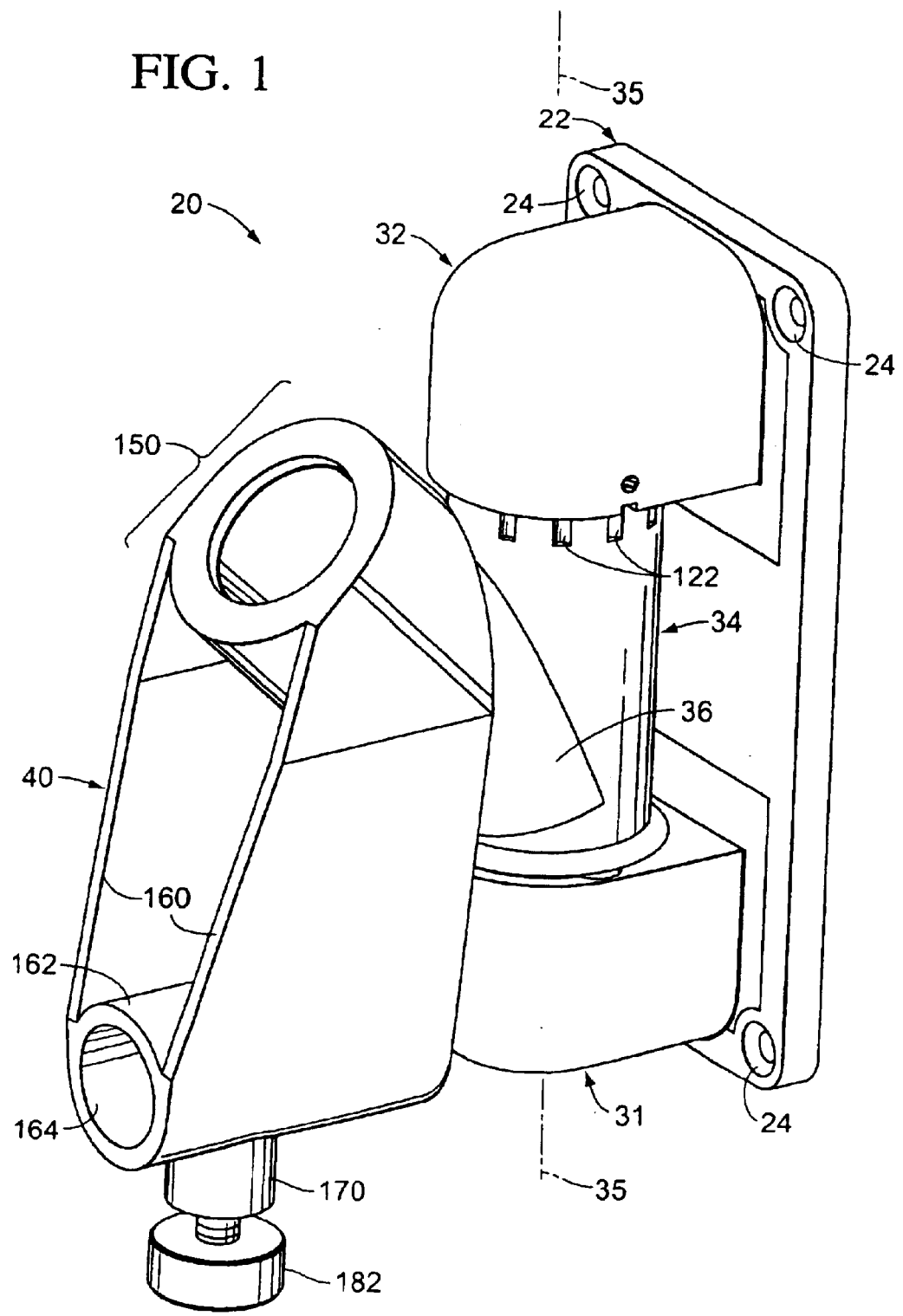
FIG. 1 is a perspective view of the device of the present invention in the form of a preferred embodiment which is adapted to hold a first member and a second member wherein each member may be, for example, a flag pole.

One form of the device of the present invention, which includes an optional bracket, is illustrated in FIG. 1 and is designated generally therein by the reference number 20. The preferred embodiment includes a plate 22 which be mounted to a support surface of a suitable structure (not illustrated). Such a suitable structure to which the bracket can be mounted may include a post, a wall, or even a horizontal surface. The plate 22 could also be mounted to a fixed or movable structure, including a piece of equipment.

In the preferred embodiment of the illustrated device 20, the device 20 is adapted to hold a first member, such as a flag pole (not shown), and a second member, such as another flag pole or banner pole (not shown). Typically, the plate 22 would be mounted to an exterior vertical surface if the device is intended to hold a flag pole.

The plate 22 includes four countersunk mounting holes 24 (FIGS. 1 and 5) which can receive mounting screws (not illustrated) for securing the plate 22 to a support surface. In some applications, it is not necessary to employ a mounting plate 22. Rather, as described hereinafter, some of the other elements of the device 20 could be mounted directly to a mounting surface by suitable mounting means, including screws, adhesive, welding, clamps, etc.

Figure 4:
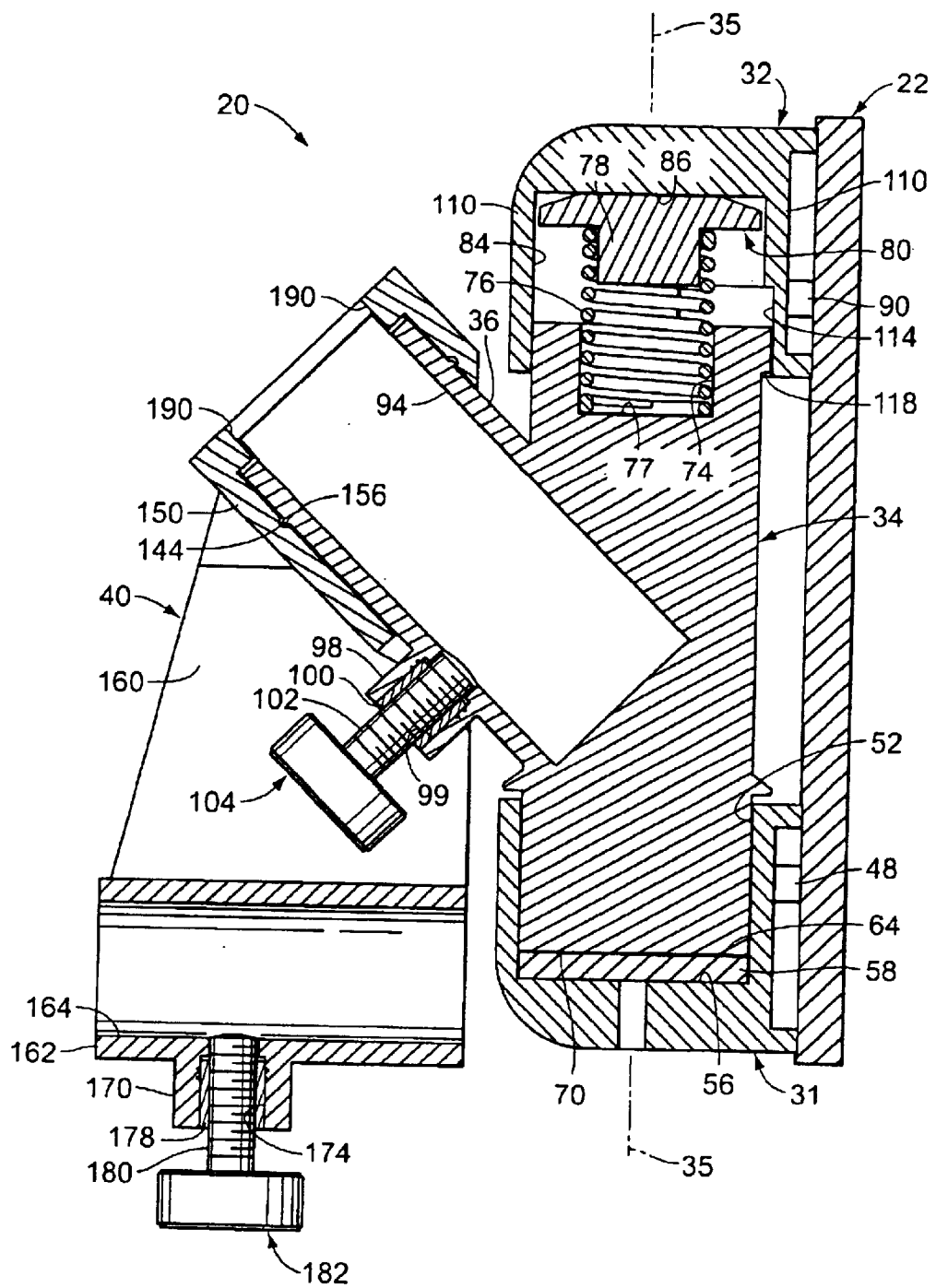
FIG. 4 is a cross-sectional view taken generally along the plane 4—4 in FIG. 2.
Figure 5:
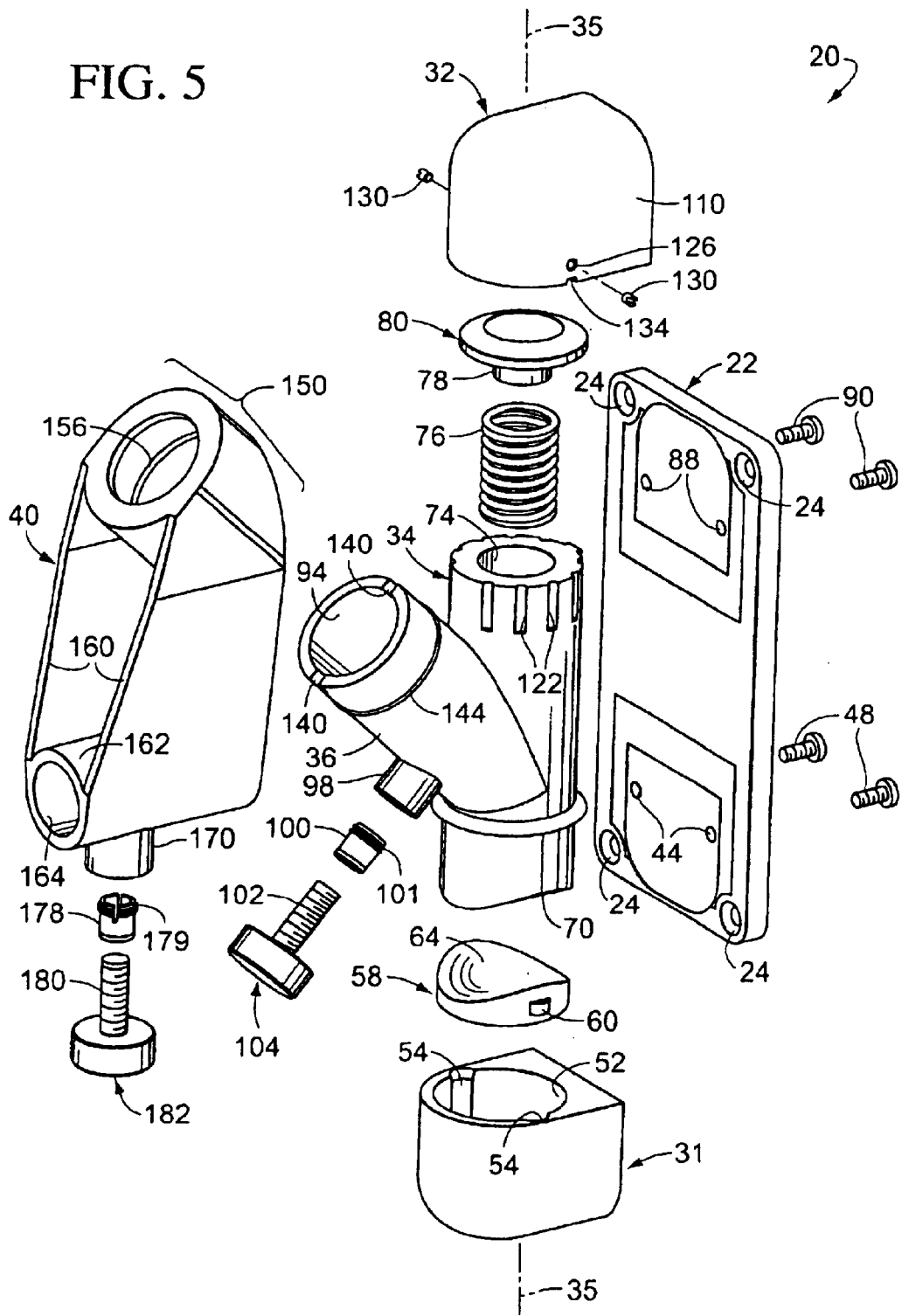
FIG. 5 is an exploded perspective view of the device illustrated in FIG. 1.

As illustrated in FIG. 1, the device 20 includes a lower, or first end cap 31 and an upper, or second end cap 32. A shaft 34 is supported between the end caps 31 and 32. The longitudinal length of the shaft 34, together with the end caps 31 and 32, define a rotational axis 35 (FIGS. 1, 4, and 5).

In the preferred embodiment illustrated in FIG. 1, a holder or arm 36 extends from the shaft 34 at an angle. The arm 36 projects from the shaft 34 as a unitary portion or extension thereof. The arm 36 is adapted to receive a first member (not shown). In the preferred embodiment illustrated in FIG. 1, the arm 36 is especially suitable for holding a flag pole.

The embodiment illustrated in FIG. 1 includes an optional bracket 40 which is mounted on the distal end of the arm 36 and which is adapted to receive a second member (not shown). In the preferred embodiment illustrated, the bracket 40 is especially suitable for holding a smaller flag pole or banner pole beneath the main flag pole.

The lower, or first end cap 31 is adapted to be attached to the plate 22 at a first location. To this end, the lower portion of the plate 22 includes a pair of attachment holes 44, and the first end cap 31 includes a matching pair of holes (not visible in FIGS. 1 and 5) which can receive threaded attachment screws 48 (FIG. 5). In a preferred embodiment, the screws 48 are self-tapping so that the first end cap 31 need be provided only with non-threaded receiving holes (not visible in the figures).

As illustrated in FIG. 5, the first end cap 31 defines a generally cylindrical cavity 52 that includes two alignment channels 54 that are 180 degrees apart. Each channel 56 is defined by a generally vertically oriented, partially cylindrical surface.

Figure 8:
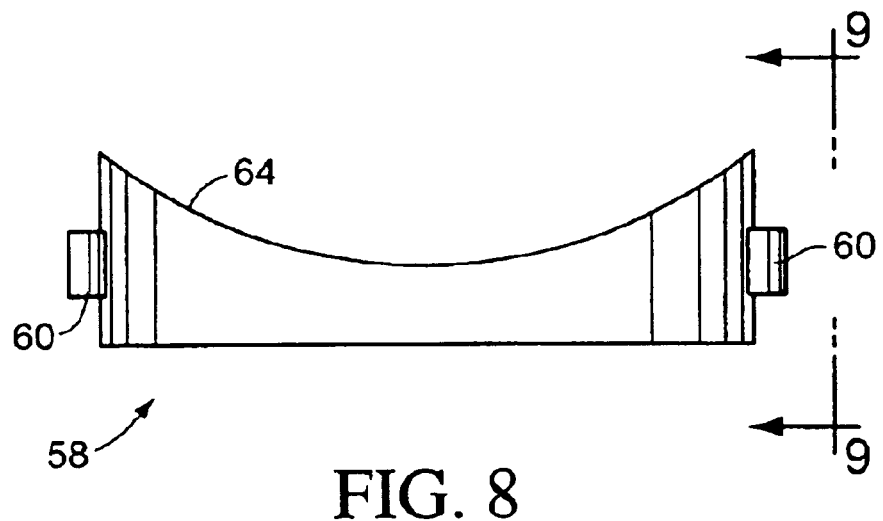
FIG. 8 is a front elevational view of the lower end cam plug.
Figure 9:
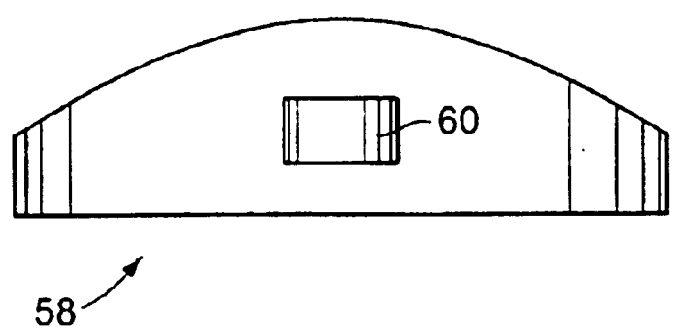
FIG. 9 is a side elevational view taken generally along the plane 9—9 in FIG. 8.

As illustrated in FIG. 4, the cavity 52 has a generally circular, flat bottom 56 for receiving a cam disc or plug 58. As illustrated in FIGS. 5, 8, and 9, the cam plug 58 has a generally circular, plan configuration with two outwardly projecting, locating lugs 60. As shown in FIG. 5, each locating lug 60 has an arcuate, lateral surface for generally mating with the arcuate surface of one of the alignment channels 54 so that the cam plug 58 can be positioned in a predetermined orientation within the first end cap 31. The cam plug 58 is symmetrical about a plane passing through the lugs 60 and axis 35. Thus, the plug 58 can be installed in the first end cap 31 in either of two 180 degree rotated positions.

As can be seen in FIG. 8, the cam plug 58 defines a generally concave cam surface 64 as viewed from the front or back along a plane parallel to the rotational axis 35. When the cam plug 58 is mounted within the lower, or first end cap 31, the cam surface 64 is in a fixed orientation at the first end cap 31. In the preferred embodiment illustrated, the concave cam surface 64 has a circular plan configuration in a plane perpendicular to the axis 35 (FIG. 5), and the concave cam surface 64 is defined by a partially cylindrical surface (as viewed in FIG. 8) in a plane parallel to the axis 35.

Figure 7:
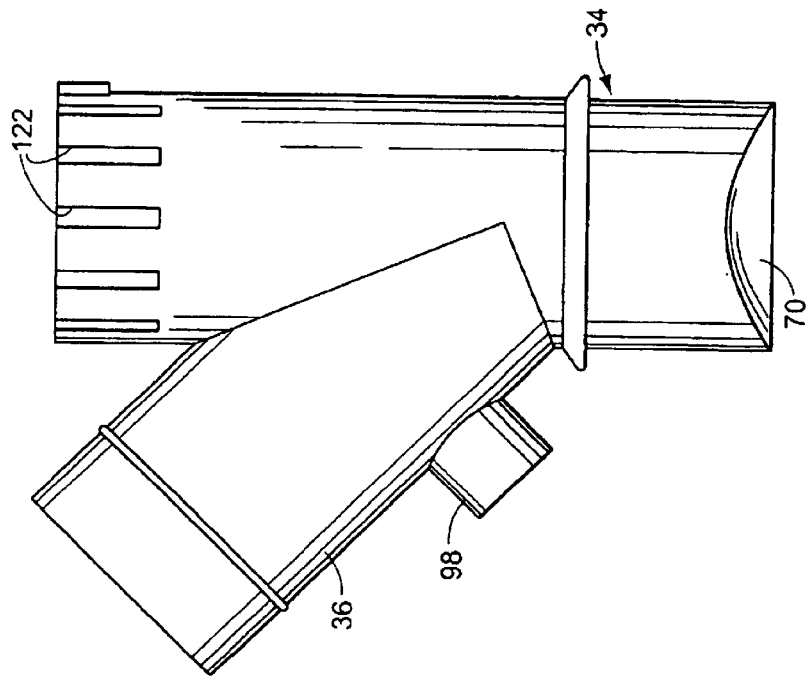
FIG. 7 is a side elevational view taken generally along the plane 7—7 in FIG. 6.

The shaft 34 has a lower, or first, end adapted to be received in the first end cap 31 on top of the cam plug 58 (FIGS. 5 and 4). The lower, or first, end of the shaft 34 defines a cam follower surface 70 (as can be seen in FIGS. 5 and 7).

Figure 6:
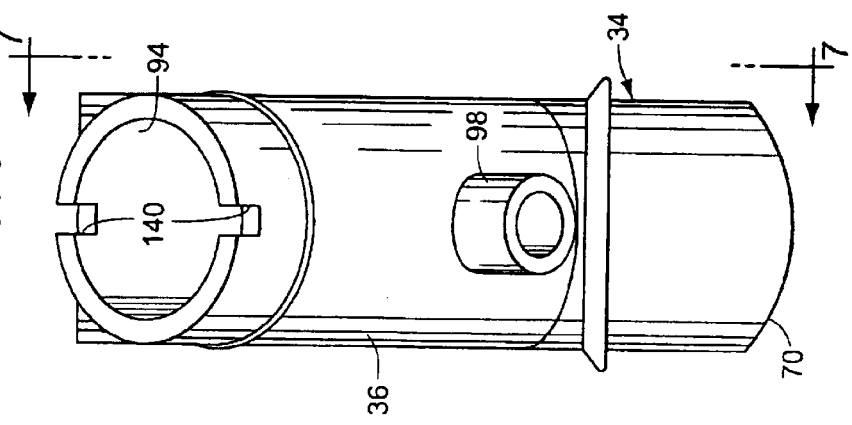
FIG. 6 is a front elevational view of the device shaft and unitary holder.

As illustrated in FIG. 6, the cam follower surface 70 at the first, or lower, end of the shaft 34 has a convex profile along a plane parallel to the axis 35. Preferably, the cam follower surface 70 is a partially cylindrical surface. Preferably, the radius of the cam surface 64 on the plug 58 is defined by a partially cylindrical concave surface having a radius that is substantially the same as the radius of the partially cylindrical, convex cam follower surface 70 on the lower or first end of the shaft 34. In other contemplated embodiments, the cam plug cam surface 64 and the shaft cam follower surface 70 may have other configurations.

The shaft cam follower surface 70 and the cam plug cam surface 64 are adapted to mate together in a predetermined home position defined by a predetermined rotational orientation wherein, as shown in FIGS. 1–4, the shaft arm 36 lies along a plane that is substantially perpendicular to the mounting plate 22. In the home position, the cam surface 64 and mating cam follower surface 70 may be said to have a nesting relationship when the components are in the predetermined home position.

As illustrated in FIG. 4, the upper end of the shaft 34 defines a generally cylindrical receiving bore 74 for receiving a helical coil spring 76 supported on a circular flat bottom surface 77. The interior of the upper end portion of the spring 76 is adapted to receive a downwardly projecting boss 78 of a bearing cap 80.

As illustrated in FIG. 4, the upper, or second, end cap 32 defines a cavity in the form of a generally cylindrical hole 84 having a circular, inside top surface 86. The upper end of the spring 76 projects into the cavity 84 and holds the bearing cap 80 against the top surface 86 in the cavity 84.

The top, second end cap 32 is preferably adapted to be secured or fastened to the bearing plate 22 in the same manner as the first end cap 31. The upper portion of the plate 22 has two attachment holes 88 for each receiving the shank of a screw 90 (FIG. 5). The second end cap 32 includes a pair of bores (not visible in the figures) for being aligned with the plate holes 88 and receiving the distal end of the upper fastening screws 90. The bores in the second end cap 32 may be threaded for receiving threaded screws 90 or, preferably, the bores in the second end cap 32 are not threaded, but the screws 90 are of the self-tapping type.

To initially assemble the components as so far described, the lower, first end bracket 31 is initially fastened to the mounting plate with the screws 48. Then the cam plug 58 is installed in the first end bracket 31. Then the shaft 34 is mounted in the first end bracket 31 on top of the cam plug 58. Then the spring 76 is disposed within the bore 74 at the top of the shaft 34. Next, the bearing cap 80 is mounted on top of the spring. Finally, the second end cap 32 is pushed down on top of the bearing cap 80 and aligned with the apertures 88 in the mounting plate 22 so the fastening screws 90 can be installed in the apertures 88 and screwed into the receiving bores (not visible) in the back of the second end cap 32.

In an alternative embodiment (not illustrated), the plate 22 could be omitted, and the end caps 31 and 32 could instead be mounted directly to a mounting surface.

The optional bracket 40 (FIGS. 1 and 5) can be omitted if the intended use of the device 20 is to support only one member (e.g., flag pole (not illustrated)). If the optional bracket 40 is omitted, a single pole or other member can still be mounted to the arm 36 of the shaft 34. To this end, the arm 36 includes an internal, generally cylindrical bore hole 94 (FIGS. 4, 6, and 11, and 12). The arm 36 includes an outwardly projecting boss 98 which defines an aperture 99 (FIGS. 4 and 6) extending through the boss 98 to the hole 94 in the arm 36.

A self-tapping insert 100 with external threads 101 (FIG. 5) is installed in the aperture 99 in the boss 98. As shown in FIG. 5, a thumb screw 102 is provided for being received in the insert 100. The insert 100 has an internal, female thread (omitted for clarity in FIG. 4) which is adapted to receive the threaded shank 102 of the thumb screw 104. After the flag pole is inserted into the hole 94 in the shaft arm 36, the thumb screw 104 can be adjusted to tightly clamp the flag pole in the device.

Figure 12:
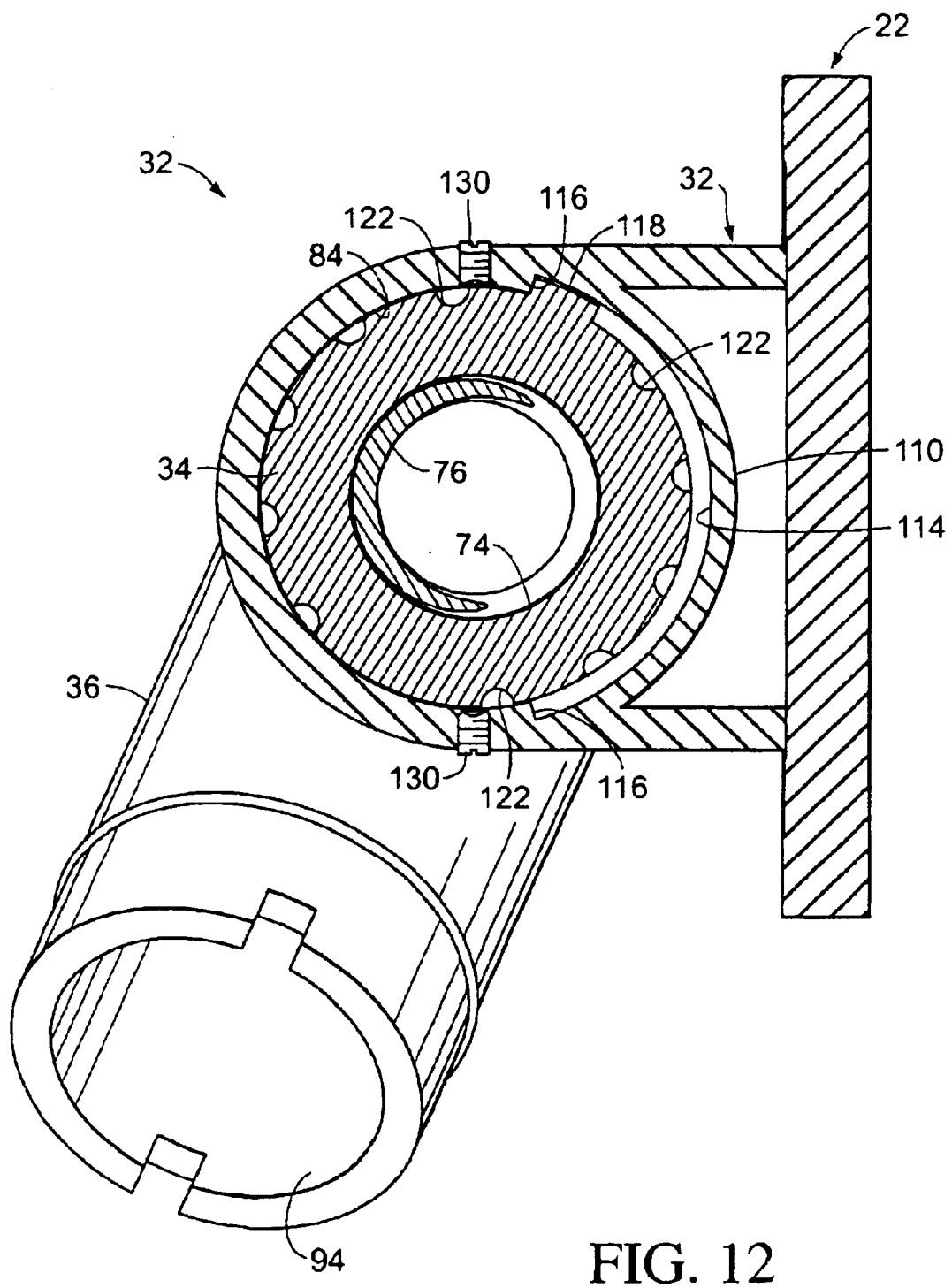
FIG. 12 is a view similar to FIG. 11, but FIG. 12 shows a moved position of the shaft and first member holder that is unitary with the shaft.

With reference to FIG. 4, it will be appreciated that the shaft 34 is retained by and between the first and second end caps 31 and 32, respectively, to accommodate at least partial rotation on the axis 35 (also shown in FIG. 5). The shaft 34 can be rotated from the predetermined home position (FIG. 11) to a rotated or moved position (FIG. 12 shows one such moved position). This could occur if a flag pole (not illustrated) was mounted in the arm 36 to suspend a flag during windy conditions, and the wind imposed forces on the flag and pole so as to rotate the arm 36 and shaft 34 (counterclockwise or clockwise as viewed in FIGS. 11 and 12).

Normally, the spring 76 (FIGS. 4 and 11) exerts an axial biasing force on the shaft upper (second) end for continuously biasing the shaft lower (first) end cam follower surface 70 (FIG. 4) against the cam surface 64 of the cam plug 58. This urges the shaft 34 toward the predetermined home position wherein the cam surface 64 and can follower surface 70 are in a generally nested and mating relationship. However, if the wind force on the flag and flag pole is sufficiently great, a torque can be imposed on the holding arm 36 and shaft 34 to cause the arm 36 and shaft 34 to rotate counterclockwise or clockwise. FIG. 12 shows the arm 36 and shaft 34 rotated clockwise to a moved position. This rotation is resisted by the spring 76, but if the torque is great enough, the cam follower surface 70 at the bottom end of the shaft 34 rides up the cam surface 64 of the cam plug 58 against the force of the spring 76, and this causes the spring 76 to compress further. If the torque is released, as, for example, if the wind dies, then the axial force exerted by the spring 76 causes the cam follower surface 70 at the lower end of the shaft 34 to move (rotate) back down the cam surface 64 on the cam plug 58 to the nested, mating home position (FIGS. 4 and 11).

In the preferred embodiment illustrated, the amount of rotation of the shaft 34 is limited so that the arm 36 (and any flag pole and flag extending therefrom) does not bang against the surface on which the bracket 22 is mounted. The mechanism for limiting the rotation of the shaft 34 is next described with reference to FIGS. 4, 11, and 12. Specifically, as can be seen in FIGS. 4 and 11, the upper, second end bracket 32 has a peripheral wall 110 that defines the main receiving cavity 84. The rear portion of the peripheral wall 110 defines a lateral recess 114 extending partially circumferentially around the rotational axis of the shaft. Each end of the recess 114 is defined by a radial abutment shoulder or surface 116 (FIG. 11). The upper end of the shaft 34 includes a rearwardly projecting rib 118 (FIGS. 4 and 11) that is received in the recess 114. As can be seen in FIG. 12, when the shaft 34 is rotated in the clockwise direction, the rotation is limited as the shaft rib 118 engages the abutment surface 116. If the shaft 34 is rotated in the clockwise direction, the shaft rib 118 will engage the other abutment surface 116 to terminate the rotation in the clockwise direction. The above-described rotation limitation system is not required, but is a desirable feature in many applications.

In some applications, it may also be desirable to hold or restrain the shaft at a specific rotational orientation. To this end, as shown in FIG. 5, the upper, second end of the shaft 34 is provided with a plurality of circumferentially spaced, vertical channels 122 which are each generally parallel to the rotational axis 35. As can be seen in FIGS. 5 and 11, the peripheral wall 110 of the second end cap 32 defines at least one, and preferably two, apertures 126 which each has an internal female thread (omitted for clarity in the figures), and which is each adapted to receive a threadingly engaged set screw 130. Each set screw 130 has an exterior slot for being engaged by the blade of a screw driver or other suitable tool. Each set screw 130 can be selectively adjusted between (1) a locking position in which the distal end of the set screw projects from the aperture 126 beyond the interior of the peripheral wall 110 into one of the shaft channels 122 to prevent rotation of the shaft, and (2) an unlocked position in which the distal of the set screw 130 is retracted outwardly of the shaft channel 122 and inside the aperture 126 in the peripheral wall 110 so as to permit rotation of the shaft 34. In FIG. 11, each set screw 130 is shown retracted out of the adjacent shaft channel 122 so as to permit the shaft 34 to rotate to one of the two maximum rotational positions illustrated in FIG. 12.

With reference to FIG. 5, it can be seen that the lower edge of the peripheral wall 110 of the upper, second end cap 32 defines a notch 134. There are two such notches 134, one on each side of the upper, second end cap 32. Each notch 134 provides a visual aid for locating and aligning the shaft vertical channels 122 with the set screws 130.

As can be seen in FIGS. 5 and 11, the outer end of the shaft arm 36 defines a pair of notches 140, and these notches 140 may optionally be used for engaging a mating detail on the optional bracket 40 (FIG. 5) as explained in detail hereinafter. The arm 36 also includes an annular bead 144 for effecting attachment of the optional bracket 40 as explained in detail hereinafter.

Specifically, as can be seen in FIG. 5, the bracket 40 includes a collar 150 adapted for mounting on the distal end of the shaft arm 36 around the arm hole 94. The inside of the collar 150 defines an annular groove or channel 156 for providing a snap-fit engagement with the arm annular bead 144. The system allows the bracket 40 to be releasably retained on the shaft arm 36.

As can be seen in FIG. 5, the bracket 40 includes a pair of spaced-apart, generally parallel, downwardly extending walls 160. The lower ends of the walls 160 merge with, and support, a receiving member 162 defining a receiving region or bore 164 which is disposed generally horizontally when the device 20 is mounted generally vertically as illustrated in FIGS. 1 and 5 and when the bracket 40 mounted on the shaft arm 36. The bracket receiving region or bore 164 is adapted for receiving an end of a second member to be supported, such as a second flag pole or banner pole or shaft.

As can be seen in FIGS. 4 and 5, a boss 170 projects downwardly from the bottom of the lower receiving member 162. The boss 170 defines an aperture 174 (FIG. 4) extending completely through the boss 170 to the receiving region or bore 164 in the lower member 162. As can be seen in FIG. 5, a self-tapping insert 178 is provided for being inserted into the aperture 174 in the boss 170. The insert 178 has an exterior thread 179 (FIG. 5) for threading into the aperture 174 of the boss 170, and the insert 178 also has an internal, female thread (omitted for clarity in FIG. 4) for receiving the threaded shank 180 of thumb screw 182. If a second member, such as a second flag pole or banner shaft, is inserted into the lower receiving region or hole 164, the thumb screw 182 can be rotated to clamp the second member tightly in place.

It will be appreciated that the bracket 40 is made so that the two sidewalls 160 spaced far enough apart to accommodate therebetween the thumb screw 104 on the shaft arm 36 (see FIGS. 4 and 5).

Figure 2:
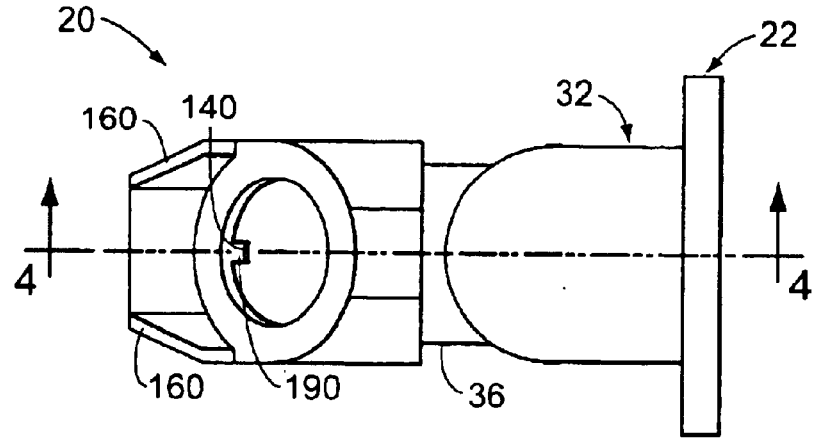
FIG. 2 is a top plan view of the device illustrated in FIG. 1.
Figure 3:
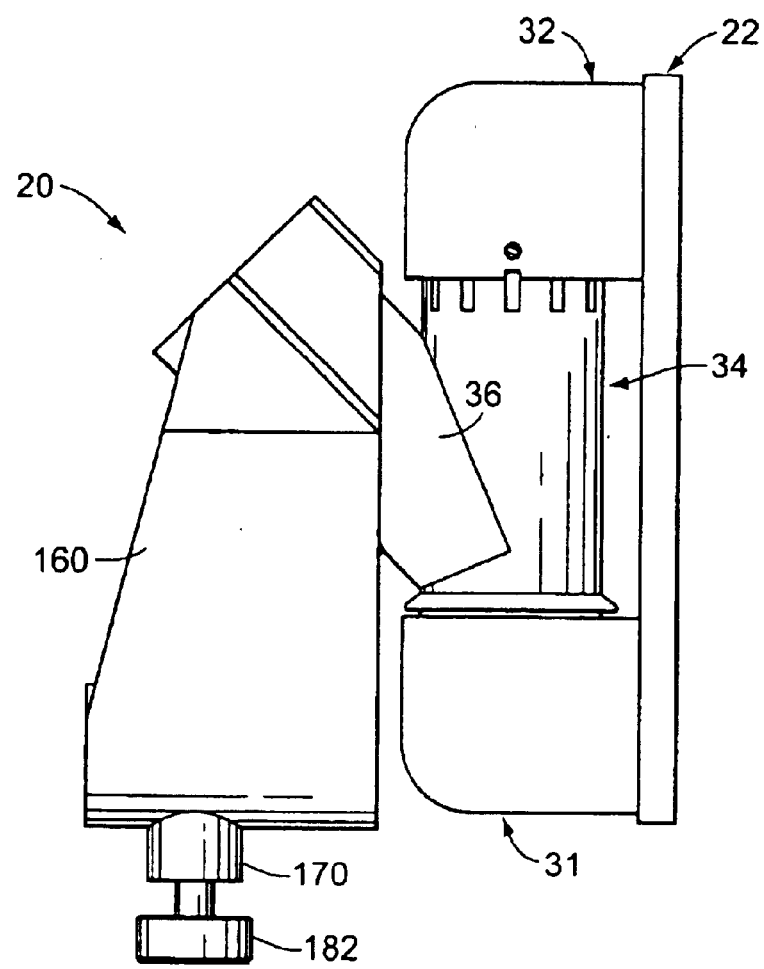
FIG. 3 is a side elevational view of the device illustrated in FIG. 1.

In order to facilitate installation of the bracket 40 on the shaft arm 36, and in order to prevent movement and rotation of the bracket 40 on the arm 36, the bracket collar 150 defines a pair of downwardly extending ribs 190 (FIG. 4) for being received in the notches 140 at the end of the arm 36. In FIG. 2, only one of the bracket collar ribs 190 is visible in mating engagement within one of the arm notches 140.

The bracket 40 is an optional feature. It may be omitted if the user of the device 20 does not want to support a second member (e.g., a second flag pole or banner pole or other member). The preferred embodiment of the bracket 40 is, however, readily installed and is readily removable.

The device 20 can be used for supporting a member other than a flag pole or banner pole. The device 20 permits the member being supported to accommodate the imposition of a predetermined minimum force which would create a torque sufficient to effect rotation of the shaft away from the predetermined, home position. Such a rotational movement can reduce the amount of force to which the member might otherwise be subjected (as when wind blows a flag and angled flag pole in the device with sufficient force to rotate the shaft more in line with the wind direction).

Alternatively, the device shaft 34 (and member supported therein) might rotate under the influence of an outside force so as to move to a position which functions as a signaling indication and/or which actuates a switch and/or which performs some similar function. When the acting force is removed, or at least reduced below the spring force, the device will return the member to the original, predetermined home position.

Further, the device can be provided with the optional features of (1) the abutment system (rib 118 and surfaces 116 in FIGS. 11 and 12) to limit rotation, and (2) the set screws 130 and shaft channels 122 (FIGS. 11 and 12) to lock the shaft at a predetermined rotational position. These optional features may be suitably used in a variety of applications to provide operational advantages.

It will be readily apparent from the foregoing detailed description of the invention and from the illustrations thereof that numerous variations and modifications may be effected without departing from the true spirit and scope of the novel concepts or principles of this invention.

What is claimed is:

1. A device for mounting on a support surface and for holding for a pole to which can be attached a web of material, said device comprising:
   (A) a plate for being mounted to said support surface;
   (B) a shaft that
      (1) defines a longitudinal axis of rotation;
      (2) has a first end and an opposite second end;
      (3) has a cam follower surface defined at said first end; and
      (4) has a radially projecting rib at said second end;
   (C) a first end cap that
      (1) is attached to said plate at a first location; and
      (2) rotatably retains said shaft first end;
   (D) a second end cap that
      (1) is attached to said plate at a second location spaced from said first location;
      (2) rotatably retains said shaft second end; and
      (3) defines two spaced-apart abutment surfaces for being engaged by said rib to limit the rotation of said shaft on said axis;
   E) a cam surface that is at said first end cap in a fixed orientation for mating with said shaft first end cam follower surface when said shaft is in a predetermined home position defined by a predetermined rotational orientation;
   (F) a holder that extends from said shaft and that defines a receiving hole for holding an end of said pole at an angle to said axis; and
   (G) a helical spring that is
      (1) received in said second end cap;
      (2) has one end restrained by said second end cap against axial movement away from said shaft second end; and
      (3) has another end for exerting an axial biasing force on said shaft second end for continuously biasing said shaft first end cam follower surface against cam surface at said first end cap to urge said shaft toward said predetermined home position whereby said shaft can be rotated away from said home position if a sufficient torque is applied to said shaft and whereby said shaft returns to said home position when said sufficient torque is removed from shaft.

2. The device in accordance with claim 1 in which
said second end cap includes a peripheral wall defining a cavity for receiving said shaft second end;
said shaft second end defines a plurality of circumferentially spaced channels which each is generally parallel to said axis;
said second end cap peripheral wall defines at least one threaded aperture extending through said peripheral wall; and
said device further includes a set screw threadingly engaged in said aperture for being selectively adjusted between (1) a locking position in which the distal end of said set screw projects from said aperture beyond the interior of said peripheral wall into one of said shaft channels to prevent rotation of said shaft, and (2) an unlocked position in which the distal end of said set screw is retracted outwardly of said channel and inside said aperture in said peripheral wall to permit rotation of said shaft.

3. The device in accordance with claim 1 in which
said cam surface has a circular plan configuration in a plane perpendicular to said axis and has a concave profile in a plane parallel to said axis; and
said cam follower surface has a generally circular plan configuration in a plane perpendicular to said axis and has a convex profile in a plane parallel to said axis.

4. The device in accordance with claim 3 in which said convex surface is defined by a partially cylindrical surface and said concave surface is defined by a partially cylindrical surface having a radius that is substantially the same as the radius of said convex surface.

5. A device for mounting on a support surface and for holding at least a first member, said device comprising:
   (A) first and second end caps for each being fixed relative to said support surface and for together defining a longitudinal axis of rotation;
   (B) a shaft that
      (1) has first and second opposite ends;
      (2) is supported between said first and second end caps along said axis with said first end at said first end cap and with said second end at said second end cap;
      (3) is at least partly rotatable on said axis; and
      (4) has a cam follower surface defined at said first end;
   (C) a cam surface in a fixed orientation at said first end cap for engaging said shaft first end cam follower surface;
   (D) a biasing mechanism at said second end cap for continuously exerting a biasing force against said shaft second end to continuously force said shaft first end cam follower surface against said cam surface at said first end cap to urge said shaft toward a predetermined home position defined by a predetermined rotational orientation whereby said shaft can be rotated away from said home position if a sufficient torque is applied to said shaft and whereby said shaft returns to said home position when said sufficient torque is removed from said shaft; and
   (E) a holder on said shaft for holding said first member.

6. The device in accordance with claim 5 in which
said device further includes a plate for being mounted to said support surface; and
said first and second end caps are separate pieces that are each attached to said plate.

7. The device in accordance with claim 5 in which said cam surface is defined on a disc which is disposed in said first end cap.

8. The device in accordance with claim 5 in which said holder is an arm projecting at an angle from said shaft, said arm defining a hole for receiving an end of said first member.

9. The device in accordance with claim 8 in which said device includes a screw for releasably engaging an end of said first member in said hole.

10. The device in accordance with claim 8 in which said device further includes a bracket mounted to said arm, said bracket defining a receiving region for receiving a second member.

11. The device in accordance with claim 10 in which said bracket is releasably retained on said arm with a snap-fit engagement defined by an annular bead on said arm and an annular channel in said bracket collar for matingly receiving said bead.

12. The device in accordance with claim 10 in which said bracket has a collar for fitting on the distal end of said arm around said hole; and said bracket receiving region is a bore for receiving an end of said second member.

13. The device in accordance with claim 12 in which said device further includes a screw for being mounted in said bracket for releasably engaging an end of said second member in said bore.

14. The device in accordance with claim 5 in which said second end cap defines a generally cylindrical recess;

said biasing mechanism includes
  (1) a bearing cap that is (a) disposed in said recess, and (b) has a boss projecting toward said shaft second end; and
  (2) a generally helical spring having one end disposed around said boss and having another end bearing against said shaft second end.

15. The device in accordance with claim 14 in which said shaft second end defines a generally cylindrical cavity for receiving said another end of said spring.

16. The device in accordance with claim 5 in which said second end cap defines a cavity for receiving said shaft second end; and said cavity is defined in part by a peripheral wall around said cavity.

17. The device in accordance with claim 16 in which said peripheral wall defines a lateral recess along a portion of said cavity, said recess extending partially circumferentially around said axis between two spaced-apart abutment surfaces; and said shaft has a rib that is at said second end and that projects into said recess for engaging either of said two spaced-apart abutment surfaces to limit the rotation of said shaft on said axis.

18. The device in accordance with claim 16 in which said shaft second end defines a plurality of circumferentially spaced channels which each is generally parallel to said axis;

said second end cap peripheral wall defines at least one threaded aperture extending through said peripheral wall; and said device further includes a set screw threadingly engaged in said aperture for being selectively adjusted between (1) a locking position in which the distal end of said set screw projects from said aperture beyond the interior of said peripheral wall into one of said shaft channels to prevent rotation of said shaft, and (2) an unlocked position in which the distal end of said set screw is retracted outwardly of said one shaft channel and inside said aperture in said peripheral wall to permit rotation of said shaft.

19. The device in accordance with claim 5 in which said cam surface has a circular plan configuration in a plane perpendicular to said axis and has a concave profile in a plane parallel to said axis; and said cam follower surface has a generally circular plan configuration in a plane perpendicular to said axis and has a convex profile in a plane parallel to said axis.

20. The device in accordance with claim 19 in which said convex surface is defined by a partially cylindrical surface and said concave surface is defined by a partially cylindrical surface having a radius that is substantially the same as the radius of said convex surface.

* * * * *